United States Patent
Pakkala et al.

(10) Patent No.: US 8,529,200 B2
(45) Date of Patent: Sep. 10, 2013

(54) SEALING AND PURGING ARRANGEMENT FOR A MAIN BEARING REGION

(75) Inventors: Srinivas Pakkala, Andhra Pradesh (IN); Nagendra Karthik Depuru Mohan, Karnataka (IN); Sendilkumaran Soundiramourty, Karnataka (IN)

(73) Assignee: General Electric Company, Schenectady, NY (US)

( * ) Notice: Subject to any disclaimer, the term of this patent is extended or adjusted under 35 U.S.C. 154(b) by 920 days.

(21) Appl. No.: 12/652,165

(22) Filed: Jan. 5, 2010

(65) Prior Publication Data

US 2011/0164964 A1 Jul. 7, 2011

(51) Int. Cl.
*F04D 29/08* (2006.01)

(52) U.S. Cl.
USPC .................. 415/168.2; 415/229; 415/230

(58) Field of Classification Search
USPC ............ 415/168.1, 168.2, 229, 230, 231, 415/110, 111, 112, 113
See application file for complete search history.

(56) References Cited

U.S. PATENT DOCUMENTS

| | | | |
|---|---|---|---|
| 4,099,727 A | 7/1978 | Weiler | |
| 5,344,160 A | 9/1994 | Scarlata et al. | |
| 5,480,232 A | 1/1996 | Lendway | |
| 6,266,954 B1 | 7/2001 | McCallum et al. | |
| 7,549,836 B2 | 6/2009 | Anderson et al. | |
| 2008/0066444 A1* | 3/2008 | Cornelius et al. | 60/39.181 |

* cited by examiner

*Primary Examiner* — Dwayne J White
(74) *Attorney, Agent, or Firm* — Cantor Colburn LLP

(57) ABSTRACT

Apparatus for sealing and purging a bearing region includes a bearing housing having at least one hole that allows a flow of air to flow through the at least one hole, and at least one bearing seal that allows the flow of air to flow through the at least one bearing seal, thereby creating a pressure difference across the bearing seal. The apparatus also includes an air directional device having at least a portion of the flow of air to flow adjacent to the air directional device, and a pair of components having a gap between the pair of components that allows the at least a portion of the flow of air to flow through the gap, thereby purging the gap.

17 Claims, 2 Drawing Sheets

SEALING AND PURGING ARRANGEMENT FOR A MAIN BEARING REGION

BACKGROUND OF THE INVENTION

The subject matter disclosed herein relates to main bearings and, more particularly, to a sealing and purging arrangement at a main bearing region.

A gas turbine includes a main rotor that requires sealing of the main bearing to prevent leakage of the bearing oil in the bearing housing or compartment. Such leakage may cause operational issues for the gas turbine. It is known to use labyrinth seals in the sealing of the bearing housing. However, these labyrinth seals oftentimes pose added cost and reliability issues.

BRIEF DESCRIPTION OF THE INVENTION

According to one aspect of the invention, apparatus for sealing and purging a bearing region includes a bearing housing having at least one hole that allows a flow of air to flow through the at least one hole, and at least one bearing seal that allows the flow of air to flow through the at least one bearing seal, thereby creating a pressure difference across the bearing seal. The apparatus also includes an air directional device having at least a portion of the flow of air to flow adjacent to the air directional device, and a pair of components having a gap between the pair of components that allows the at least a portion of the flow of air to flow through the gap, thereby purging the gap.

According to another aspect of the invention, apparatus for sealing and purging a bearing region includes a bearing housing having at least one hole that allows a flow of air to flow through the at least one hole, and at least one bearing seal that allows the flow of air to flow through the at least one bearing seal, thereby creating a pressure difference across the bearing seal. The apparatus also includes an air directional device having at least a portion of the flow of air to flow adjacent to the air directional device, and a rotor and stator having a gap between the rotor and the stator that allows the at least a portion of the flow of air to flow through the gap, thereby purging the gap.

According to yet another aspect of the invention, a method of sealing a bearing housing containing oil includes routing a flow of air through one or more holes located in the bearing housing, and routing the flow of air through at least one bearing seal, thereby creating a pressure difference across the bearing seal to seal the oil within the bearing housing. The method also includes routing at least a portion of the flow of air adjacent to an air directional device, and routing the at least a portion of the flow of air through a gap between a rotor and a stator, thereby purging the gap.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
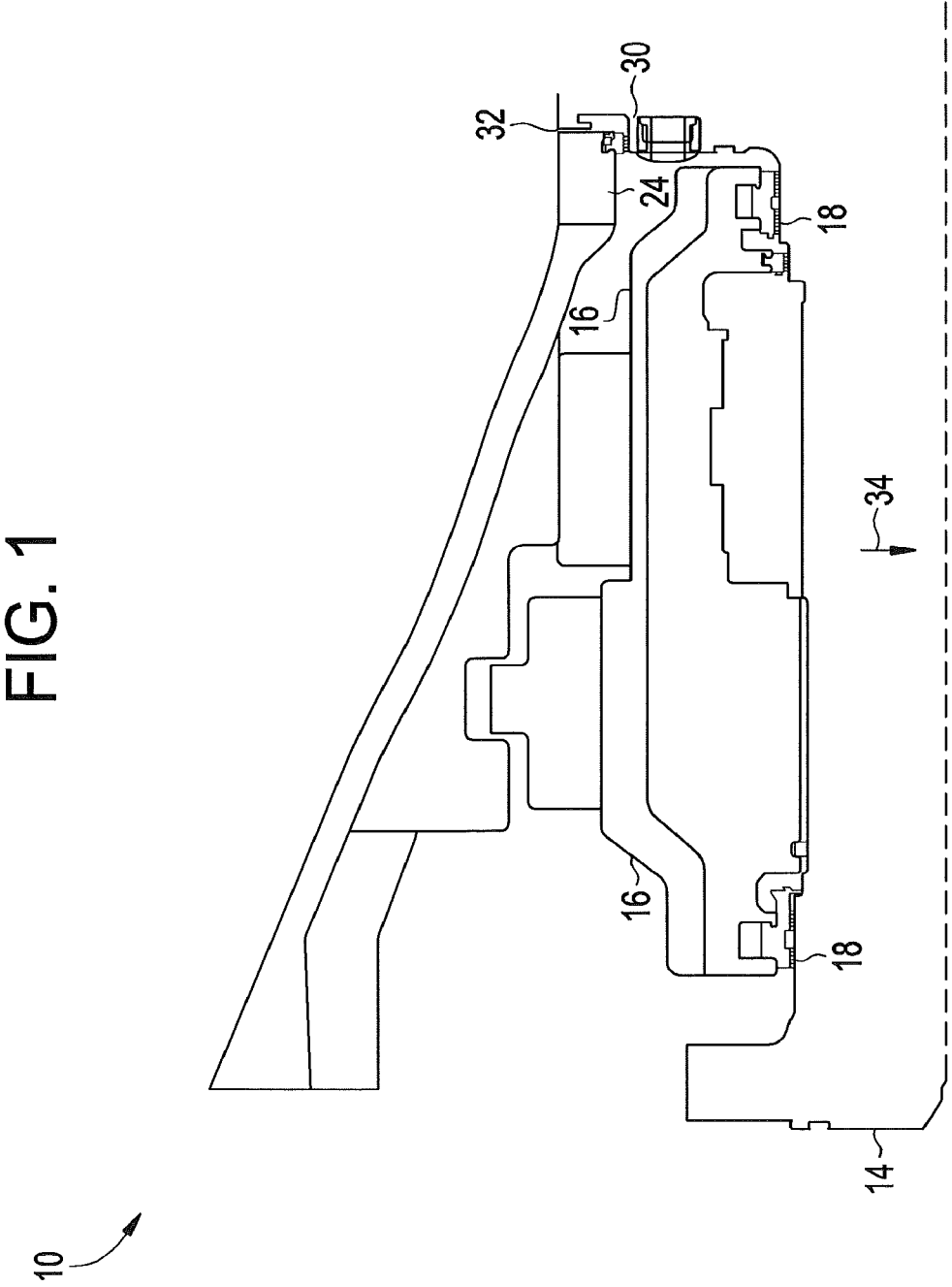
FIG. 1 is a cross section of a bearing region in which embodiments of the present invention may be located.

In FIG. 1 is shown a portion of a gas turbine 10, specifically, at a main or #1 bearing region of the gas turbine 10, in which embodiments of the present invention may be located. Embodiments of the present invention are not limited to a bearing region of a gas turbine. Embodiments of the present invention may be located in devices other than a gas turbine, wherein these other devices include a bearing region to be sealed in accordance with embodiments of the present invention. The main bearing region of the gas turbine 10 may include a rotor 14, a bearing housing 16 and bearing seals 18. Also included may be an inlet guide vane (IGV) shroud 24, a forward stub shaft (FSS) 30, and a gap or cavity 32 between the rotor 14 and a stator. In embodiments of the present invention located in devices other than a gas turbine, the rotor 14 and stator may comprise other components in which a gap is located between these other components. A line with an arrowhead 34 shows a flow of bearing oil from the bearing housing 16 to a sump. Embodiments of the present invention effectively seal the bearing oil within the bearing housing 16 and prevent any leakage from the bearing housing 16, including into a main airflow path, which may cause issues with operation of the gas turbine 10. The one or more bearings within the bearing housing 16 may comprise vacuum-type bearings for the rotor 14, which are those where the bearing oil within the housing 16 is drained due to suction. That is, the sump is maintained at a pressure lower than the atmospheric pressure.

Figure 2:
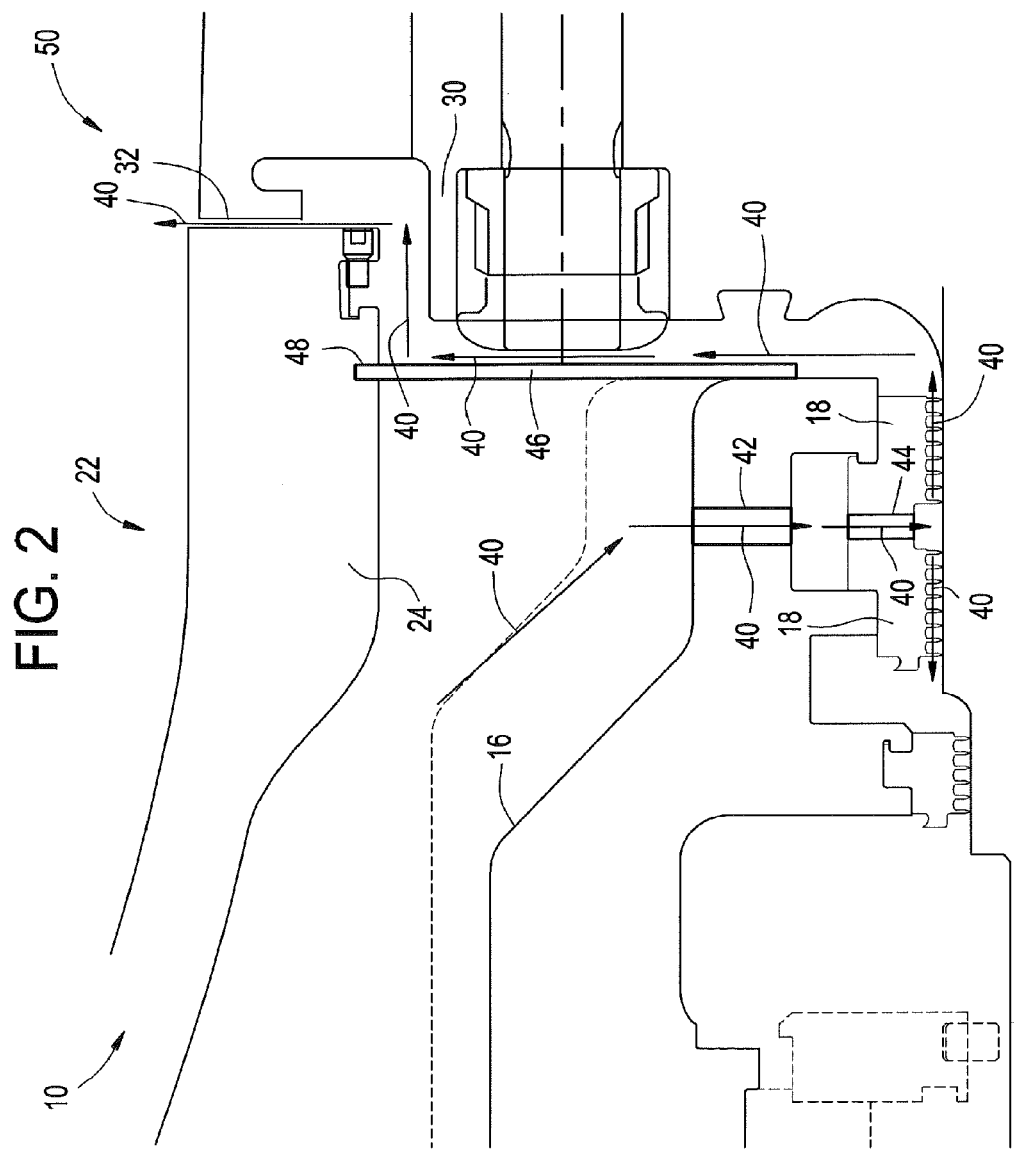
FIG. 2 is a more detailed cross section of a portion of the bearing region in which embodiments of the present invention may be located.

In FIG. 2 is shown a more detailed cross section the main or #1 bearing portion of the gas turbine 10 in which embodiments of the present invention may be located. In an embodiment, a flow of ambient air as indicated by the line with an arrowhead 40 may come from the surrounding atmosphere of the gas turbine 10. The flow of ambient air 40 may then pass through a load tunnel compartment of the gas turbine 10 before getting into the main or #1 bearing region. There, the flow of ambient air 40 passes through holes 42, 44 formed in the bearing housing 16, in accordance with an embodiment of the present invention. The holes 42, 44 may be circular or any other suitable shape. The ambient airflow 40 then passes through the bearing seals 18, and a portion of the airflow 40 passes adjacent to a cover plate 46 or other suitable air directional device, according to an embodiment of the present invention. The ambient air flow 40 passing through the bearing seals 18 creates a relatively high pressure difference across the seals 18, which prevents the oil from leaking out from the bearing housing 16.

The cover plate 46 may be fitted into a groove 48 formed in the IGV shroud 24 for attachment purposes. Other suitable methods of attaching the cover plate 46 in the desired location may be utilized. A portion of the cover plate 46 may be located adjacent to or abutting the bearing housing 16. The cover plate 46 may comprise nodular cast iron, sheet metal, or other suitable material. The flow of ambient air 40 then passes through the rotor-stator gap or cavity 32 before entering a main airflow path 50. The cover plate 46 blocks the flow of ambient air from flowing directly to the gap 32 between the rotor and stator.

In embodiments of the present invention, a flow of ambient air 40 is routed through the main or #1 bearing seals 18 and then through the rotor-stator (RO) gap 32. This provides for relatively effective #1 bearing oil sealing (i.e., primarily by the forward portion of the seals 18 in FIG. 2), thereby achieving a reduction in the amount of oil leakage from the bearing housing 16. In addition, the routing of the ambient air flow 40 in accordance with embodiments of the present invention reduces the amount of air leakage flow from the ambient air entering the holes 42, 44 in the bearing housing 16 and passing through the rotor-stator gap 32 and into the main airflow path 50. A greater amount of air leakage flow passing through the rotor-stator gap 32 and into the main airflow path 50 may disturb the flow of air in the main airflow path 50. At the same time, the reduced amount of the flow of air 40 through the rotor-stator gap 32 and into the main airflow path 50 is still high enough to allow for purging of the rotor-stator gap or cavity 32, which is a desirable effect.

Embodiments of the invention provide for one or more holes 42, 44 in the bearing housing 16. Also provided is a cover plate 46. This configuration of the holes 42, 44 ensures a relatively effective seal of the bearing #1 oil within the housing 16. Without the cover plate 46, a forward stub shaft (FSS) labyrinth seal 52 (FIG. 1) is needed for restricting the flow to the rotor-stator gap 32. Adding a cover plate 46 eliminates the need for the use of a FSS labyrinth seal 52, with the bearing seal 18 aft portion taking care of any flow restriction. Embodiments of the invention provide for a relatively more effective oil sealing with a relatively higher delta P (i.e., higher air pressure difference) across the bearing seals 18 at the #1 bearing aft end. Also, the overall oil sealing and air purging system of embodiments of the present invention is relatively more reliable, since the rotor surface is closed. As such, the necessity for use of the forward stub shaft (FSS) labyrinth seal can be eliminated, thereby providing for cost saving and improved reliability. Further, the amount of air flow into the main flow path 50 through the rotor-stator (RO) gap 32 may be reduced by a relatively significant amount at any given flow path pressure condition, thereby meeting certain aerodynamic requirements.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. Apparatus for sealing and purging a bearing region, comprising:
    a bearing housing having at least one hole that allows a flow of air to flow through the at least one hole;
    at least one bearing seal that allows the flow of air to flow through the at least one bearing seal, thereby creating a pressure difference across the bearing seal;
    an air directional device having at least a portion of the flow of air to flow adjacent to the air directional device; and
    a pair of components having a gap between the pair of components that allows the at least a portion of the flow of air to flow through the gap, thereby purging the gap, wherein
    the air directional device comprises a plate having a surface that allows the at least a portion of the flow of air to flow adjacent to the surface.

2. The apparatus of claim 1, wherein the air directional device comprises a surface that allows the at least a portion of the flow of air to flow adjacent to the surface.

3. The apparatus of claim 1, wherein the bearing housing has a pair of holes that allow the flow of air to flow through the pair of holes and to the at least one bearing seal.

4. The apparatus of claim 1, wherein the flow of air comprises a flow of ambient air.

5. The apparatus of claim 1, wherein the air directional device blocks the flow of air from flowing directly to the gap.

6. The apparatus of claim 1, wherein the pair of components comprises a rotor and stator of a gas turbine.

7. Apparatus for sealing and purging a bearing region, comprising:
    a bearing housing having at least one hole that allows a flow of air to flow through the at least one hole;
    at least one bearing seal that allows the flow of air to flow through the at least one bearing seal, thereby creating a pressure difference across the bearing seal;
    an air directional device having at least a portion of the flow of air to flow adjacent to the air directional device; and
    a rotor and stator having a gap between the rotor and the stator that allows the at least a portion of the flow of air to flow through the gap, thereby purging the gap, wherein
    the air directional device comprises a plate having a surface that allows the at least a portion of the flow of air to flow adjacent to the surface.

8. The apparatus of claim 7, wherein the air directional device comprises a surface that allows the at least a portion of the flow of air to flow adjacent to the surface.

9. The apparatus of claim 7, wherein the bearing housing has a pair of holes that allow the flow of air to flow through the pair of holes and to the at least one bearing seal.

10. The apparatus of claim 7, wherein the flow of air comprises a flow of ambient air.

11. The apparatus of claim 7, wherein the air directional device blocks the flow of air from flowing directly to the gap.

12. The apparatus of claim 7, wherein the rotor and the stator comprise a portion of a gas turbine.

13. A method of sealing a bearing housing containing oil, the method comprising:
    routing a flow of air through one or more holes located in the bearing housing;
    routing the flow of air through at least one bearing seal, thereby creating a pressure difference across the bearing seal to seal the oil within the bearing housing;
    routing at least a portion of the flow of air adjacent to an air directional device; and
    routing the at least a portion of the flow of air through a gap between a rotor and a stator, thereby purging the gap, wherein
    after routing the at least a portion of the flow of air through a gap between a rotor and a stator, further comprising routing the at least a portion of the flow of air into a main flow path.

14. The method of claim 13, wherein the routing a flow of air through one or more holes located in the bearing housing comprises routing the flow of air through a pair of holes located in the bearing housing.

15. The method of claim 13, wherein the routing a flow of air through one or more holes located in the bearing housing comprises routing the flow of air through the one or more holes and to the at least one bearing seal.

16. The method of claim 13, wherein the routing the flow of air through at least one bearing air seal comprises routing the flow of air through at least one bearing seal and routing the at least a portion of the flow of air adjacent to an air directional device.

17. The method of claim 13, further comprising the step of blocking the flow of air from flowing directly to the gap between the rotor and stator.

\* \* \* \* \*